United States Patent Office 3,456,009
Patented July 15, 1969

3,456,009
β-LOWER ALKOXYPHENETHYLGUANIDINE
SALTS
Albert Lawrence Green, Cumbernauld, Scotland, and
 George Lawrence Willey, Welwyn Garden City,
 England, assignors to Smith Kline & French
 Laboratories, Philadelphia, Pa., a corporation of
 Pennsylvania
No Drawing. Filed Aug. 25, 1967, Ser. No. 663,231
Claims priority, application Great Britain, August 1966,
38,951/66
Int. Cl. C07c *129/08*
U.S. Cl. 260—564                       7 Claims

ABSTRACT OF THE DISCLOSURE

Phenethylguanidine salts having a β-lower alkoxy substituent and optionally substituted on the phenyl ring by one or two halogen, lower alkyl or lower alkoxy substituents have antihypertensive activity.

---

This invention relates to pharmaceutically acceptable acid addition salts of β-lower alkoxyphenethylguanidines which are new compounds. The compounds of this invention have pharmacological activity. The invention also relates to pharmaceutical compositions containing these compounds.

The novel guanidine derivatives which, as the pharmaceutically acceptable salts thereof, are the objects of this invention are represented by the general formula:

Formula I

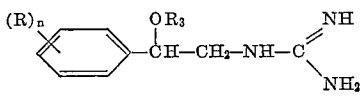

wherein R is halogen, lower alkyl or lower alkoxy; $R_3$ is lower alkyl, preferably methyl and $n$ is 0–2.

The pharmaceutically acceptable acid addition salts of the optical isomers of the guanidine derivatives of Formula I are also included within the scope of the present invention.

The terms "lower alkyl" and "lower alkoxy" are used herein as meaning respectively straight or branched chain alkyl and alkoxy groups containing from 1 to 5 carbon atoms.

The compounds of Formula I may be prepared by any of the suitable known general methods of preparing guanidine compounds. For instance, they can be prepared by reacting an amine represented by the general formula:

Formula II

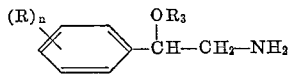

wherein R, $n$ and $R_3$ have the same meaning as in Formula I or an acid addition salt of the amine, with cyanamide or a compound of the general formula:

Formula III

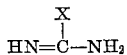

or an acid addition salt thereof, wherein X is a replaceable group which will react with the amino group in the compound of Formula II to give the guanidine derivative of Formula I. For example X may represent $SR_4$, $OR_4$ or

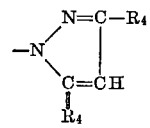

wherein $R_4$ is an alkyl group, advantageously a lower alkyl group and preferably methyl. Thus the amine of Formula II or its acid addition salt may be reacted with for example, a S-methylisothiouronium salt such as S-methylisothiouronium sulfate, an O-methylisouronium salt or 1-amidino-3:5-dimethyl-pyrazole. The guanidine is isolated in the form of an acid addition salt. The reaction is generally carried out in an inert polar solvent, advantageously water.

The amines of Formula II may be prepared by reacting an ω-nitro compound represented by the general formula:

Formula IV

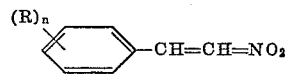

wherein R has the same meanings as in Formula I, with an alkali-metal compound of the general formula:

wherein $R_3$ has the same meaning as in Formula I and M is an alkali-metal, preferably sodium, and reducing the resulting compound with a reducing agent which will hydrogenate the nitro group as well as the olefinic double bond, for example lithium aluminum hydride.

The compounds of the invention have been found to exhibit pharmacological activity in the animal body. In particular the compounds have antihypertensive activity in warm blooded mammals. For example, lowering of blood pressure is produced in unanesthetized, neurogenic dogs at doses of 10 to 40 mg./kg. administered orally. β-Methoxyphenethylguanidine sulfate has been found to exhibit antihypertensive activity in warm blooded mammals while having a low propensity to cause cardiac irregularities.

It will be appreciated that for therapuetic use the pharmacologically active compounds of the invention can be administered in the form of a pharmaceutical composition comprising at least one such compound as an essential active ingredient in association with a pharmaceutical carrier therefor. Advantageously the composition can be made up in a dosage unit form appropriate to the desired mode of administration, which may be by the oral or parenteral route. Thus the dosage unit may be in the form of, for example, a tablet or capsule for oral administration or a sterile powder or solution packaged in an ampule for parenteral administration.

EXAMPLE 1

β-Methoxyphenethylamine (13.8 g.), S-methylisothiouronium sulfate (13 g.) and water (50 ml.) are heated to about 60° C. at which temperature evolution of methyl mercaptan begins. The temperature is raised to 100° C. over one hour and then maintained at this temperature for a further hour until evolution of methyl mercaptan ceases. On cooling β-methoxyphenethylguanidine sulfate crystallizes as white crystals which are filtered off, sucked partly dry and recrystallized from water (100 ml.) after decolorization with charcoal. Recrystallization of this product gives β-methoxyphenethylguanidine sulfate having A.M.P. of 212–214° C.

The β-methoxyphenethylamine starting material (a known compound) is prepared by reacting ω-nitro-styrene with sodium methoxide followed by reduction with lithium aluminum hydride.

EXAMPLE 2

Following the method described in Example 1, p,β-dimethoxyphenethylamine is converted into p,β-dimethoxyphenethylguanidine sulfate, which when recrystallized from water gives a M.P. of 186–187° C. (dec.).

EXAMPLE 3

Following the method described in Example 1, β-methoxy-m-methylphenethylamine is converted into β-methoxy-m-methylphenethylguanidine sulfate, M.P. 199–200° C. when recrystallized from ethanol/isopropanol.

The starting amine is prepared by the reaction of m-methylbenzaldehyde with nitromethane and sodium methoxide to give β-methoxy-β-(m-methylphenyl)nitroethane which is reduced with lithium aluminum hydride to give β-methoxy-m-methylphenethylamine, B.P. 116–118° C./12 mm., $n_D^{25}$ 1.1562.

EXAMPLE 4

Following the method described in Example 1, o-chloro-β-methoxyphenethylamine is converted into o-chloro-β-methoxyphenethylguanidine sulfate, M.P. 228–229° C. (from methanol/isopropanol).

The starting amine is prepared by the reaction of o-chlorobenzaldehyde with nitromethane to give o-chloro-ω-nitrostyrene (M.P. 44–45° C. from hexane) followed by the addition of sodium methoxide and reduction with lithium aluminum hydride to give o-chloro-β-methoxyphenethylamine, B.P. 84° C./0.3 mm.

EXAMPLE 5

Following the method described in Example 1, 2,4-dichloro-β-ethoxyphenethylamine is converted into 2,4-dichloro-β-ethoxyphenethylguanidine sulfate, M.P. 241–242° C. (from methanol/isopropanol).

The starting amine is prepared by the reaction of 2,4-dichloro-ω-nitrostyrene with sodium ethoxide to give β-(2,4-dichlorophenyl)-β-ethoxynitroethane which is reduced with lithium aluminum hydride to give 2,4-dichloro-β-ethoxyphenethylamine, B.P. 113° C./0.4 mm., $n_D^{25}$ 1.5360.

EXAMPLE 6

A solution of β-methoxyphenethylguanidine sulfate (prepared as in Example 1) in hot water is treated with one equivalent of potassium bicarbonate. The guanidium bicarbonate which separates is filtered off and dissolved in hot water. The resulting solution is treated with a slight excess of nitric acid. After cooling and filtering, β-methoxyphenethylguanidine nitrate is obtained.

Similarly, other salts are prepared using other acids in place of nitric acid in the above procedure.

EXAMPLE 7

A mixture of β-methoxy-o-methylphenethylamine (15 g.), S-methylisothiouronium sulfate (13 g.) and water (50 ml.) is heated to about 60° C., then the temperature is raised to 100° C. over one hour and maintained at this temperature for a further hour. Cooling, filtering and recrystallizing gives β-methoxy-o-methylphenethylguanidine sulfate.

By the same procedure using p,β-diethoxyphenethylamine in place of β-methoxy-o-methylphenethylamine, the product is p,β-diethoxyphenethylguanidine sulfate.

Similarly using, in the above procedure, β-methoxy-m-propoxyphenethylamine, the product is β-methoxy-m-propoxyphenethylguanidine sulfate.

According to the same procedure using β,3,4-trimethoxyphenethylamine, the product is β,3,4-trimethoxyphenethylguanidine sulfate.

EXAMPLE 8

Heating p-bromo-β-methoxyphenethylamine, S-methylisothiouronium sulfate and water and working up by the procedure of Example 7 gives p-bromo-β-methoxyphenethylguanidine sulfate.

The starting amine is prepared by the reaction of p-bromobenzaldehyde with nitromethane and sodium methoxide to give β-(p-bromophenyl)-β-methoxynitroethane which is reduced with lithium aluminum hydride to give p-bromo-β-methoxyphenethylamine.

By the same procedure using p-butoxy-β-methoxyphenethylamine (prepared from p-butoxybenzaldehyde by the procedure described above), the product is p-butoxy-β-methoxyphenethylguanidine sulfate.

Similarly, using, in the above procedure, p-butyl-β-methoxyphenethylamine; β-methoxy - o - pentyloxyphenethylamine; 3,4 - diethoxy - β - methoxyphenethylamine; β-methoxy-2,6-dimethylphenethylamine and β-methoxy-3,4-dipropoxyphenethylamine (prepared from p-butyl-benzaldehyde; o - pentyloxybenzaldehyde; 3,4 - diethoxybenzaldehyde; 2,6-dimethylbenzaldehyde and 3,4-dipropoxybenzaldehyde, respectively, by the procedure described above), the products are, respectively, p-butyl-β-methoxyphenethylguanidine sulfate; β-methoxy-o-pentyloxyphenethylguanidine sulfate; 3,4-diethoxy-β-methoxyphenethylguanidine sulfate; β-methoxy-2,6-dimethylphenethylguanidine sulfate and β-methoxy-3,4-dipropoxyphenethylguanidine sulfate.

EXAMPLE 9

A mixture of β-butoxyphenethylamine (8.8 g.), S-methylisothiouronium sulfate (6.5 g.) and water (25 ml.) is heated and worked up by the procedure of Example 7 to give β-butoxyphenethylguanidine sulfate.

The starting amine is prepared by reaction of benzaldehyde with nitromethane and sodium butoxide to give β-butoxy-β-phenylnitroethane which is reduced with lithium aluminum hydride to give β-butoxyphenethylamine.

Similarly using β-pentyloxyphenethylamine (prepared by the above procedure using sodium pentoxide in place of sodium butoxide) in the above procedure, the product is β-pentyloxyphenethylguanidine sulfate.

What is claimed is:

1. A pharmaceutically acceptable acid addition salt of a compound of the formula:

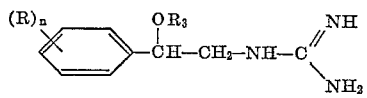

in which:

R is chloro, bromo, lower alkyl or lower alkoxy;
$R_3$ is lower alkyl and
n is 0–2.

2. A compound according to claim 1 in which R is methyl and n is 1.

3. A compound according to claim 1 said compound being a pharmaceutically acceptable acid addition salt of β-methoxy-phenethylguanidine.

4. A compound according to claim 1 said compound being a pharmaceutically acceptable acid addition salt of p,β-dimethoxy-phenethylguanidine.

5. A compound according to claim 1 said compound being a pharmaceutically acceptable acid addition salt of β-methoxy-m-methyl-phenethylguanidine.

6. A compound according to claim 1 said compound being a pharmaceutically acceptable acid addition salt of o-chloro-β-methoxy-phenethylguanidine.

7. A compound according to claim 1 said compound being a pharmaceutically acceptable acid addition salt of 2,4-dichloro-β-ethoxyphenethylguanidine.

References Cited

UNITED STATES PATENTS

| | | | |
|---|---|---|---|
| 3,050,559 | 8/1962 | Burger | 260—570.5 |
| 3,159,676 | 12/1964 | Spickett et al. | 260—564 |
| 3,377,245 | 4/1968 | Fielden et al. | 167—65 |

FOREIGN PATENTS

| | | |
|---|---|---|
| 1,025,799 | 4/1966 | Great Britain. |

OTHER REFERENCES

Madinaveitia (I), "Chemical Abstracts," vol. 16, p. 92 (1922).

Madinaveitia (II), "Chemical Abstracts," vol. 16, pp. 1946–47 (1922).

Bhatnagar et al., "Chemical Abstracts," vol. 32, p. 512 (1938).

Burger (I), "Medicinal Chemistry," 2nd ed., p. 597 (1960).

ROBERT V. HINES, Primary Examiner

U.S. Cl. X.R.

260—570.6, 612, 645, 646; 424—326